US008340597B1

(12) United States Patent
Nabar et al.

(10) Patent No.: US 8,340,597 B1
(45) Date of Patent: Dec. 25, 2012

(54) CALIBRATION CORRECTION FOR IMPLICIT BEAMFORMING IN A WIRELESS MIMO COMMUNICATION SYSTEM

(75) Inventors: Rohit U. Nabar, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 892 days.

(21) Appl. No.: 11/681,548

(22) Filed: Mar. 2, 2007

Related U.S. Application Data

(60) Provisional application No. 60/796,849, filed on May 2, 2006.

(51) Int. Cl.
*H03C 7/02* (2006.01)

(52) U.S. Cl. ............... 455/101; 455/562.1; 455/67.11; 455/69; 370/334

(58) Field of Classification Search .......... 370/260, 370/241, 335, 347; 455/562.1, 513, 522
See application file for complete search history.

(56) References Cited

U.S. PATENT DOCUMENTS

| | | | |
|---|---|---|---|
| 6,760,385 B1 | 7/2004 | Ketchum et al. | |
| 7,065,146 B1 | 6/2006 | Lou et al. | |
| 7,729,439 B2* | 6/2010 | Zhang et al. | 375/267 |
| 2004/0082356 A1* | 4/2004 | Walton et al. | 455/522 |
| 2004/0087324 A1* | 5/2004 | Ketchum et al. | 455/513 |
| 2005/0128953 A1* | 6/2005 | Wallace et al. | 370/241 |
| 2007/0206504 A1* | 9/2007 | Koo et al. | 370/245 |
| 2007/0206686 A1* | 9/2007 | Vook et al. | 375/260 |
| 2009/0061786 A1* | 3/2009 | Malik et al. | 455/69 |

OTHER PUBLICATIONS

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," *The Institute of electrical and electronics Engineers, Inc.*, (1999).

"Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

(Continued)

*Primary Examiner* — Kamran Afshar
*Assistant Examiner* — Shahriar Behnamian

(57) ABSTRACT

A transmitter beamforming technique for use in a MIMO wireless communication system determines a calibration factor and then applies the calibration factor to a transmit beamforming steering matrix developed using implicit beamforming, i.e., using an estimate of a forward channel disposed between a transmitter and a receiver based on a measurement of the reverse channel disposed between the receiver and the transmitter. The beamforming technique first determines descriptions of both the forward and reverse channels, determines an estimate of the forward channel from the description of the reverse channel, determines right singular matrixes which model the forward channel and the estimated forward channel and then develops a calibration factor from the determined right singular matrixes. The beamforming technique then applies the determined calibration factor to a steering matrix which is calculated using a standard implicit beamforming technique, i.e., assuming that the forward channel can be described as the transpose of the reverse channel. The use of this beamforming technique provides superior beamforming results when using implicit beamforming without having to take the necessary steps to determine a description of the actual forward channel each time a new steering matrix is to be calculated.

1 Claim, 6 Drawing Sheets

OTHER PUBLICATIONS

Draft Supplement to STANDARD [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band, *Institute of Electrical and Electronics Engineers, Inc.*, (2003).

Mujtaba, S., "TGn Sync Proposal Technical Specification" (2005).

"Part 16: Air Interface for Fixed Broadband Wireless Access Systems- Amendments 2: Medium Access Control Modifications and Additional Physical Layer Specifications for 2-11 GHz," *The Institute of Electrical and Electronics Engineers, Inc.*, (2003).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band, *The Institute of Electrical and Electronics Engineers, Inc.*, (1999).

"Supplement to IEEE Standard for Information technology—Telecommunications and information exchange between systems—Local and metroplitan area networks—Specific requirements—Part 11: Wireless LAN Medium Access Control (MAC) and Physical Layer (PHY) specifications: Higher-Speed Physical Layer Extension in the 2.4 GHz Band," *The Institute of elctrical and electronics Engineers, Inc.*, (1999).

\* cited by examiner

CALIBRATION CORRECTION FOR IMPLICIT BEAMFORMING IN A WIRELESS MIMO COMMUNICATION SYSTEM

RELATED APPLICATION

This is a regular-filed application which is based on and claims priority to U.S. Provisional Patent Application Ser. No. 60/796,849, entitled "Calibration Correction Calculation for Implicit Beamforming in MIMO Systems," which was filed on May 2, 2006, the entire disclosure of which is hereby incorporated by reference herein.

FIELD OF TECHNOLOGY

The present invention relates generally to wireless communication systems and, more particularly, to a system and method for beamforming while transmitting information in a multiple-input, multiple-output wireless communication system.

DESCRIPTION OF THE RELATED ART

An ever-increasing number of relatively cheap, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to pre-condition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmission antennas to produce high gain lobes in particular or predetermined directions. These techniques include, for example, transmit-MRC (maximum ratio combining) and singular value decomposition (SVD). An important part of determining the steering matrix is taking into account the specifics of the channel between the transmitter and the receiver, referred to herein as the forward channel. As a result, steering matrixes are typically determined based on the CSI of the forward channel. However, to determine the CSI or other specifics of the forward channel, the transmitter must first send a known test or calibration signal to the receiver, which then computes or determines the specifics of the forward channel (e.g., the CSI for the forward channel) and then sends the CSI or other indications of the forward channel back to the transmitter, thereby requiring signals to be sent both from the transmitter to the receiver and then from the receiver back to the transmitter in order to perform beamforming in the forward channel. Moreover, this exchange must occur each time the forward channel is determined (e.g., each time a steering matrix is to be calculated for the forward channel).

To reduce the amount of startup exchanges required to perform beamforming based on CSI or other channel information, it is known to perform implicit beamforming in a MIMO communication system. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter.

Unfortunately, however, radio frequency (RF) chain impairments in the form of gain/phase imbalances and coupling losses impair the ideal reciprocity between the forward and the reverse channels, making it necessary to perform additional calibration exchanges each time the forward channel is being determined, to account for these impairments. In any event, these RF chain impairments render the use of implicit beamforming (which estimates the forward channel based solely on an estimate of the reverse channel) inferior in practice.

SUMMARY

A transmitter beamforming technique for use in a MIMO wireless communication system determines a calibration factor and then applies the calibration factor to a transmit beamforming steering matrix developed using implicit beamforming, i.e., using an estimate of a forward channel disposed between a transmitter and a receiver based on a measurement of the reverse channel disposed between the receiver and the transmitter. The beamforming technique first determines measured descriptions of both the forward and reverse channels, determines an estimate of the forward channel from the measured description of the reverse channel, determines right singular matrixes which model the forward channel and the estimated forward channel and then develops a calibration factor from the determined right singular matrixes. Thereafter, each time a steering matrix is to be calculated for the forward channel, the beamforming technique applies the determined calibration factor to a steering matrix which is determined using a standard implicit beamforming technique, i.e., assuming that the forward channel can be described as the transpose or matrix transpose of the reverse channel. The use of this beamforming technique provides superior beamforming results when using implicit beamforming without having to take the necessary steps to determine a description of the actual forward channel each time a new steering matrix is to be calculated.

According to one embodiment, a method of beamforming within a communication system having a transmitter with a plurality of transmitter antennas and a receiver having a multiplicity of receiver antennas includes determining a description of a forward channel in which a signal travels from the transmitter to the receiver, determining a description of a reverse channel in which a signal travels from the receiver to the transmitter and developing a calibration factor from the description of the forward channel and the description of the reverse channel. Thereafter, the method develops a steering matrix using an estimate of the forward channel and the calibration factor and uses the steering matrix to perform beamforming in the forward channel.

If desired, the method may develop the steering matrix by developing the estimate of the forward channel from a description of the reverse channel. In this case, developing the estimate of the forward channel may include measuring the propagation effects on a signal traveling from the receiver to the transmitter to determine the description of the reverse channel and determining the transpose of the description of the reverse channel as the estimate of the forward channel. If desired, determining the description of the reverse channel may include expressing the reverse channel in matrix form and determining the transpose of the description of the reverse channel by transposing the matrix form of the description of the reverse channel.

Moreover, the method may determine the description of the forward channel by sending a known signal from the transmitter to the receiver, detecting the known signal at the receiver and determining the description of the forward channel from the detected known signal. Additionally, if desired, determining the description of the reverse channel may include sending a known signal from the receiver to the transmitter, detecting the known signal at the transmitter and determining the description of the reverse channel from the detected known signal.

In one case, developing the calibration factor from the description of the forward channel and the description of the reverse channel may include developing an estimate of the forward channel from the description of the reverse channel, determining one or more right singular matrixes defining the description of the forward channel, determining one or more right singular matrixes defining the description of the estimate of the forward channel and developing the calibration factor as a function of the one or more right singular matrixes of the forward channel and the one or more right singular matrixes of the estimate of the forward channel. If desired, developing the calibration factor as a function of the one or more right singular matrixes of the forward channel and the one or more right singular matrixes of the estimate of the forward channel may include determining the calibration factor as a product of (1) one of the one or more right singular matrixes of the forward channel and the one or more right singular matrixes of the estimate of the forward channel and (2) a transposed and conjugated version of the other one of the one or more right singular matrixes of the forward channel and the one or more right singular matrixes of the estimate of the forward channel. Here, developing the steering matrix may include developing an estimate of the forward channel from a detected description of the reverse channel, developing an implicit steering matrix from the estimate of the forward channel and developing a corrected steering matrix by combining the calibration factor with the implicit steering matrix. Additionally, using the steering matrix to perform beamforming in the forward channel may include using the corrected steering matrix.

Still further, determining the one or more right singular matrixes defining the description of the forward channel, or determining the one or more right singular matrixes defining the description of the estimate of the forward channel may include using singular value decomposition to determine the one or more right singular matrixes defining the description of the forward channel or the one or more right singular matrixes defining the description of the estimate of the forward channel.

In another embodiment, a wireless transmitter for transmitting signals to one or more receivers includes a multiplicity of transmission antennas, a beamforming network coupled to the multiplicity of transmission antennas and a controller coupled to the beamforming network to control the beamforming network using a steering matrix so as to produce, via the multiplicity of transmission antennas, a transmit gain pattern having one or more high gain lobes. The wireless transmitter also includes a calibration factor calculation unit that obtains a description of a forward channel in which a signal travels from the transmitter to a receiver, obtains a description of a reverse channel in which a signal travels from the receiver to the transmitter, and develops a calibration factor from the description of the forward channel and the description of the reverse channel. A steering matrix calculation unit is then adapted to develop the steering matrix using an estimate of the forward channel and the calibration factor.

In yet another embodiment, a wireless communication system includes a transmitter having a plurality of transmission antennas, a receiver, a multiplicity of receiver antennas associated with the receiver and a beamforming network coupled to the plurality of transmission antennas. A controller is coupled to the beamforming network to control the beamforming network using a steering matrix so as to produce a transmit gain pattern based on the steering matrix while a calibration factor calculation unit develops a calibration factor from a description of a forward channel in which a signal travels from the transmitter to the receiver and from a description of a reverse channel in which a signal travels from the receiver to the transmitter. Additionally, a steering matrix calculation unit develops the steering matrix using an estimate of the forward channel and the calibration factor.

In still another embodiment, a beamforming system for use in a wireless communication system having a transmitter with multiple transmission antennas and one or more receivers having a plurality of receiver antennas includes a computer readable memory and a routine stored on the computer readable memory and adapted to be executed on a processor to determine a calibration factor and to calculate a steering matrix using the calibration factor and a measured description of a reverse channel, in which a signal travels from one of the receivers to the transmitter. The routine then uses the steering matrix to implement beamforming in a forward channel, in which a signal travels from the transmitter to the one of the receivers.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
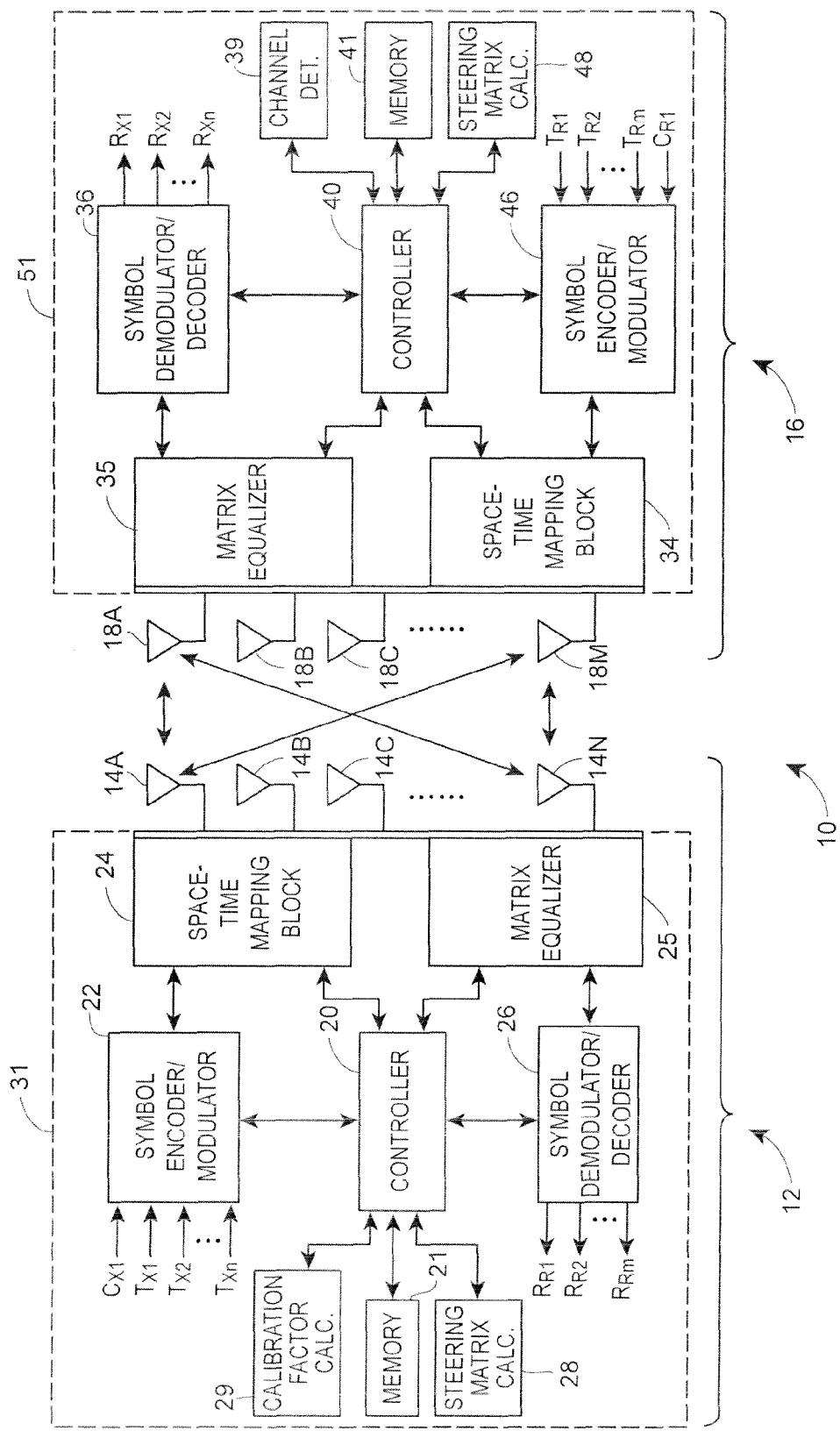
FIG. 1 is a block diagram of a wireless MIMO communication or transmission system that determines and uses a calibration factor as part of an implicit beamforming technique used in a transmitter of the MIMO communication system.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28 and a calibration factor calculation unit 29. The controller 12 may be any desired type of controller and the controller 12, the steering matrix calculation unit 28 and the calibration factor calculation unit 29 may be implemented as one or more standard multi-purpose, programmable processors, such as micro-processors, as application specific integrated circuits (ASICs), or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the calibration factor calculation unit 29, the space-time mapping block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 12, to thereby perform beamsteering or beamforming via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings as processed by the matrix equalizer 35. In this process, these signals may be downconverted to baseband. Generally, the demodulator and decoder unit 36 may operate to remove effects of the forward channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{RI}$ a to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{Rf}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40, a calibration factor determined by the calibration factor calculation unit 29, etc. may be stored in the memories 21 and 41.

As is generally known, beamforming or beamsteering typically includes applying appropriate phases and gains to the various signals as sent through the multiple transmission antennas 14A-14N, in a manner with causes the signals sent from the different transmission antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16 or to the receiver 16 in general.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. Generally speaking, the steering matrix for any particular frequency channel of the MIMO system 10 (in the forward channel between the transmitter 12 and the receiver 16) may be determined by the steering matrix calculation unit 28 based on the CSI determined for that forward channel. In this case, the steering matrix calculation unit 28 may use any desired beam steering or matrix computation techniques, such as transmit-MRC or SVD techniques, to compute the steering matrix. As these techniques are well known in the art, they will not be discussed in detail herein.

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission. Additionally, if desired, the transmitter 12 may determine the CSI or other measured description of the reverse channel, i.e., the channel from the receiver 16 to the transmitter 12, from the signal(s) sent from the receiver 16 including, for example a further known test or control signal $C_{Rf}$. In any event, in this case, the transmitter 12 must first send a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel.

To avoid the use of multiple communications between a particular transmitter/receiver pair each time a steering matrix is to be computed for the forward channel and still reduce or account for the errors introduced by RF chain impairments in a standard implicit beamforming technique, the transmitter 12 may use an implicit beamforming technique that applies a calibration factor during the beamforming process to compensate for measured differences between the actual forward and reverse channels. In particular, this technique first determines a calibration or correction factor as a function of measured descriptions of the forward and the reverse channels. Then, each lime a new steering matrix is to be calculated for the forward channel, the beamforming technique applies the calibration factor to a steering matrix determined using a basic implicit beamforming technique, so that, once the calibration factor is determined, the transmitter may simply perform implicit beamforming using a measured description of the reverse channel (i.e., the channel between the receiver and the transmitter) to produce an estimate of the forward channel (i.e., the channel between the transmitter and the receiver).

More particularly, a calibration factor routine running within, for example, the calibration factor calculation unit 29 of FIG. 1, may first cause a control or test signal $C_{x1}$ to be sent to the receiver 16. The receiver 16 receives this signal in any known or desired manner and may then determine, from this signal, the CSI or other measured description of the forward channel, referred to herein as $H_F$. The receiver 16 may then send an indication of the forward channel $H_F$ back to the transmitter 12 as part of a calibration sequence and may additionally send a known test or control signal back to the transmitter 12 as part of the calibration sequence. The transmitter 12 receives the signal(s) from the receiver 16 and the steering matrix calculation unit 28 may determine from these signals the CSI or other measured description of the reverse channel, referred to herein as $H_R$. The transmitter 12, and in particular the steering matrix calculation unit 28, also determines or receives the measured description of the forward channel $H_F$.

Next the calibration factor routine may use the measured descriptions of the forward channel $H_F$ and the reverse channel $H_R$ to determine a calibration or correction factor for use in future beamsteering activities. In particular, the calibration factor routine may first determine the transpose (e.g., matrix transpose) of the description of the reverse channel $H_R$ in any desired manner to develop an inferred forward channel $H_I$, also referred to herein as an estimate of the forward channel. In one embodiment, the measured descriptions of the forward and the reverse channels $H_F$ and $H_R$ may be expressed in matrix form, and in this case, the transpose of the reverse channel $H_R$ may generally be obtained as the transpose of the channel description matrix for the reverse channel $H_R$. Ideally, the estimate of the forward channel $H_I$ (which again is the transpose of the measured description of the reverse channel $H_R$) would be equal to the measured description of the forward channel $H_F$. However, because of RF chain impairments, this ideal situation will rarely if ever exist in actual implementation. To compensate for these RF chain impairment errors, the calibration factor routine determines the calibration factor so that, when the calibration factor is multiplied by the estimate of the description of the forward channel $H_I$, it produces the actual measured description of the forward channel $H_F$.

One manner that the calibration factor routine may use to calculate the calibration factor includes determining the right singular matrixes that define each of the forward channel $H_F$ and the estimate of the forward channel $H_I$. In particular, the calibration factor routine may perform SVD or any other method or technique which determines a set of right singular matrixes that accurately describes or defines the forward channel $H_F$ and another set of right singular matrixes that accurately describes or defines the estimate of the forward channel $H_I$. This determination can be expressed mathematically as:

$$H_F = U_F \Sigma V_F^H \text{ and} \quad (1)$$

$$H_I = U_I \Sigma V_I^H \quad (2)$$

wherein:
$U_F$ and $U_I$ are the left singular matrixes for the forward channel and the estimate of the forward channel; and
$V_F$ and $V_I$ are the right singular matrixes which define the forward channel and the estimate of the forward channel determined using, for example, an SVD technique.

The superscript H in equations (1) and (2) above and (3) below denotes the conjugate transpose of the associated matrix while the $\Sigma$ function in these equations denotes the diagonal singular value matrix.

Next, the calibration factor C can be determined as $$C = V_F * V_I^H \quad (3)$$

After the calibration factor routine determines the calibration factor C, this calibration factor C may be stored in the memory 21 or in any other desired memory. The steering matrix calculation unit 28 may, thereafter, simply determine a new steering matrix using implicit beamforming, i.e., by determining an uncompensated or implicit steering matrix using any standard implicit beamforming technique, e.g., based on the assumption that the inferred channel (i.e., the estimate of the forward channel) $H_I$ is equal to the actual forward channel $H_F$, but then multiplying the uncompensated steering matrix by the calibration factor C to create a compensated or corrected steering matrix that takes into account the errors introduced by RF chain impairments. As will be understood using this technique, once the calibration factor C (which can be a matrix) has been obtained for the forward channel between a particular transmitter/receiver pair, the transmitter can determine a new steering matrix for the forward channel at any time using implicit beamforming and the calibration factor C (and thus relying only on signals transmitted from the receiver to the transmitter, i.e., in the reverse channel).

While the calibration factor C has been described herein as being developed from right singular matrixes for the forward channel $H_F$ and from right singular matrixes for the inferred channel $H_I$ developed using an SVD technique, any other desired calculation technique such as transmit MRC can be used to compute or determine the right singular matrixes for the forward and inferred channels $H_F$ and $H_I$ when developing the calibration factor C. Likewise, it may be possible to develop other calibration factors that compensate for the effects of RF chain impairments and other non-equalities that prevent the forward channel $H_F$ from equaling or being the same as the inferred channel $H_I$ developed from the reverse channel $H_R$, and these other calibration factors may be used as well or instead of the calibration factor specifically described herein.

Figure 2:
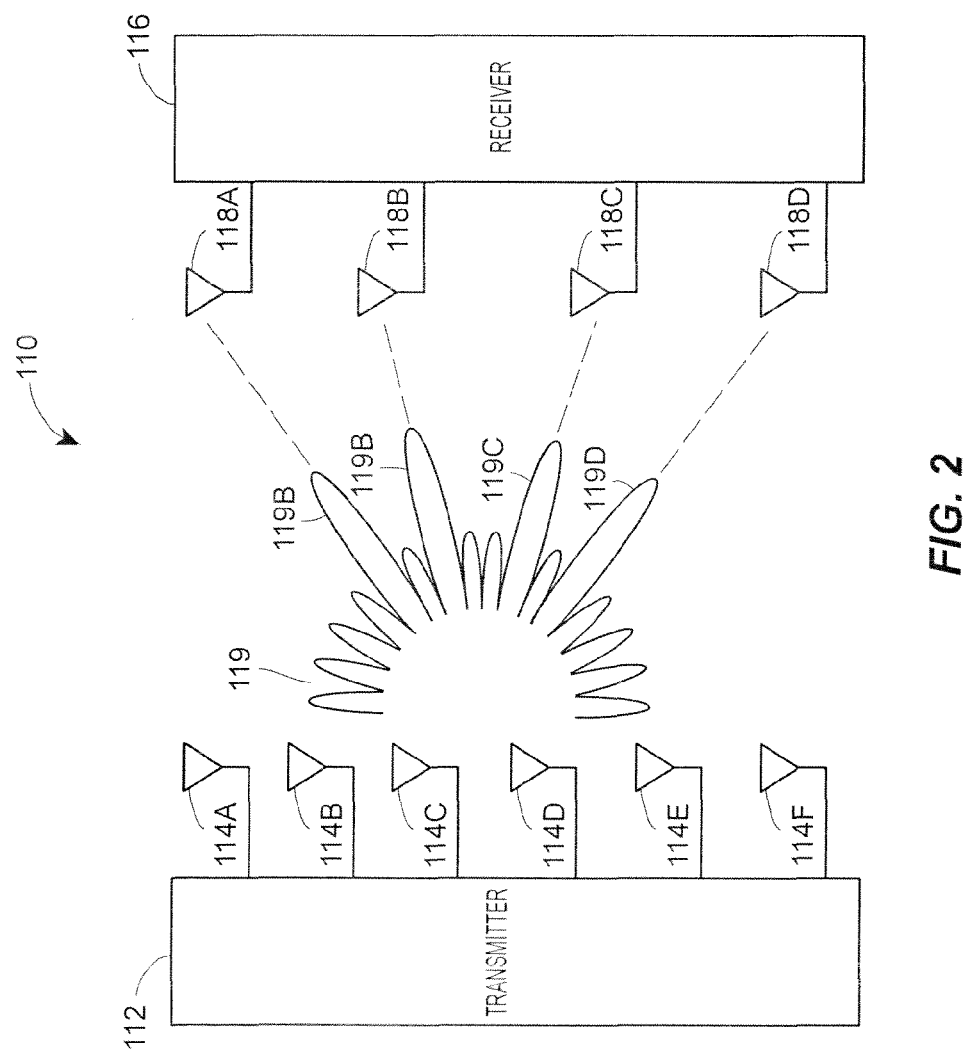
FIG. 2 is a block diagram illustrating a transmit gain pattern for wireless communications between a single transmitter and a single receiver implementing a transmitter beamforming technique that uses a calibration factor as part of an implicit beamforming technique.

To illustrate the beamforming technique described herein, FIG. 2 shows a MIMO communication system 110 having a single transmitter 112 with six transmission antennas 114A-114F, and a single receiver 116 with four receiver antennas 118A-118D. In this example, the steering matrix is developed by the transmitter 112 using a corrected steering matrix developed in the manner described above to create a transmit gain pattern 119 as shown disposed next to the transmitter 112. As illustrated in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates a separate high gain lobe directed to each of the receiver antennas 118A-118D, it will be understood that the actual gain pattern produced by the beam steering matrix calculations using implicit beamforming and a calibration factor may not necessarily include a separate high gain lobe for each of the receiver antennas 118A-118D. Instead, the gain pattern developed by the beam steering matrix for the transmitter 112 may have a single high gain lobe covering or directed generally to more than one of the receiver antennas 118A-118D. Thus, it is to be understood that the beam pattern resulting from the creation of a steering matrix using implicit beamforming and a calibration factor may or may not have separate high gain lobes separated by low gain regions or nulls for each of the receiver antennas.

Of course, developing the beam pattern 119 to have high gain regions and low gain regions based on a calibration factor may be performed in any desired manner and location. For example, any of the components within the receiver 16 of FIG. 1, including the controller 40, the steering matrix calculation unit 48 and the channel determination unit 39 may determine the CSI or other measured description of the forward channel and, if desired may determine the right singular matrixes for the forward channel from this information. The receiver 16 may then send any of this determined information to the transmitter 12. If desired, however, the receiver 16 may simply collect the known signal received from the transmitter 12 and may send this signal back to the transmitter 12 without processing this signal in any significant manner, and the transmitter 12 may then determine the measured description of the forward channel from this information. In either case, the controller 20 and/or the steering matrix calculation unit 28 and/or the calibration factor calculation unit 29 within the transmitter 12 may use the information determined about the forward channel and/or the reverse channel to compute the right singular matrix components for the forward and/or the reverse (or estimate) channels and may then calculate and apply the calibration factor (which may be in the form of a correction matrix) in determining the steering matrix for use in the space-time mapping block 24 to thereby implement beamforming in the forward channel.

The use of a beamforming technique using the calibration factor described herein can, in certain instances, significantly reduce the computational complexity needed to perform the steering matrix calculations, as well as reduce the amount of feedback required to perform beamsteering, as less CSI may need to be sent from the receiver to the transmitter. Moreover, the use of the calibration factor in implicit beamforming as described herein, in many cases, may give better performance while performing implicit beamsteering to a particular receiver.

It will be understood that the actual beamforming or steering matrix equations, e.g., the computation of the steering matrix, may be performed at any desired location within the wireless communication system 10 of FIG. 1, including within the controller 20 or other hardware, software, or firmware of the transmitter 12, as well as within the controller 40 or other hardware, software, or firmware of the receiver 16. In the later case, the receiver 16 may compute the SVC components to be used by the transmitter 12 based on the specifics of the forward channel determined at the receiver 16 and, if desired, the CSI developed by the receiver 16, and may send this information to the transmitter 12 to be used in calculating the calibration factor or calibration matrix. On the other hand, the steering matrix for the transmitter space-time mapping block 24 of FIG. 1 may be calculated by the steering matrix calculation unit 28 within the transmitter 12 based on raw channel data or signals sent by the receiver 16 provided and sent back from the receiver 16 to the transmitter 12.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. In this case, the transmitter may perform or implement a separate calibration factor calculation for each receiver to which the transmitter will transmit and may therefore develop a different steering matrix and/or calibration factor for each of the possible receivers, and may use those steering matrixes to beamform to the separate or different receivers at different times or using different channels. e.g., OFDM channels, of the system. Moreover, while the maximum gains of the high gain lobes of each of the transmit gain patterns illustrated in FIG. 2 are shown as being the same, the steering matrix calculation units 28 and 48 may develop steering matrixes which produce high gain lobes with differing maximum gains.

While the beamforming and steering matrix calculations described herein are described in one example as being implemented in software stored in, for example, one of the memories 21, 41 and implemented on a processor associated with one or both of the controllers 20, 40, the steering matrix calculation units 28, 48 and/or the units 29 and 39 of the MIMO communication system 10 of FIG. 1, these routines may alternatively or additionally be implemented in digital or analog hardware, firmware, application specific integrated circuits, etc., as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 3A-3H, various exemplary implementations of the present invention are shown.

Figure 3A:
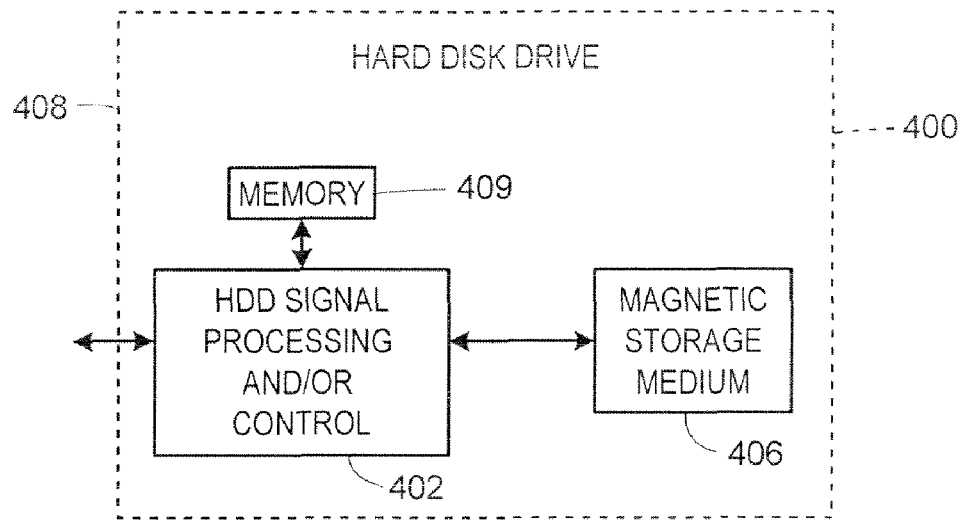
FIGS. 3A-3H illustrate examples of various different devices in which a wireless communication system implementing the beamforming techniques described herein may be used.

Referring to FIG. 3A, the present invention may be used with a hard disk drive 400 which includes both signal processing and/or control circuits, which are generally identified in FIG. 3A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the beamforming techniques described above. HDD 400 may be connected to memory 409, such as random access memory (RAM), a low latency nonvolatile memory such as flash memory, read only memory (ROM) and/or other suitable electronic data storage.

Figure 3B:
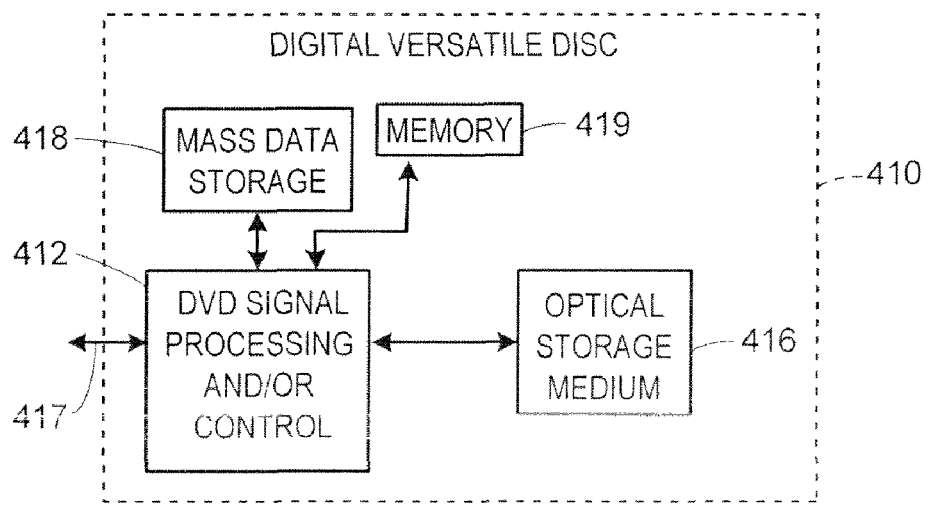

Referring now to FIG. 3B, the present invention may be embodied in or used with a digital versatile disc (DVD) drive 410 which may include either or both signal processing and/or control circuits, which are generally identified in FIG. 3B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the beamforming techniques described above. DVD 410 may communicate with mass data storage 418 that stores data in a nonvolatile manner. Mass data storage 418 may include a hard disk drive (HDD) such as that shown in FIG. 3A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 3C:
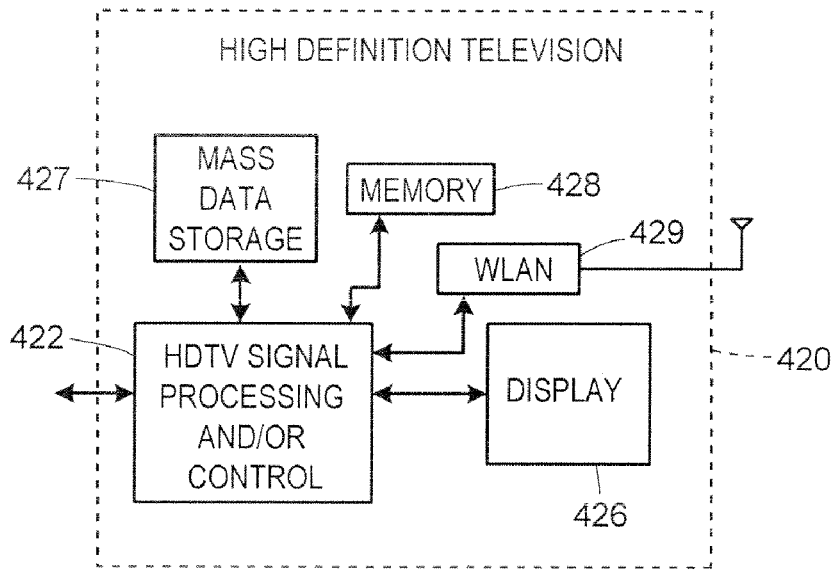

Referring now to FIG. 3C, the present invention may be embodied in a high definition television (HDTV) 420 which may include either or both signal processing and/or control circuits, which are generally identified in FIG. 3C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 3A and/or at least one DVD may have the configuration shown in FIG. 3B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 3D:
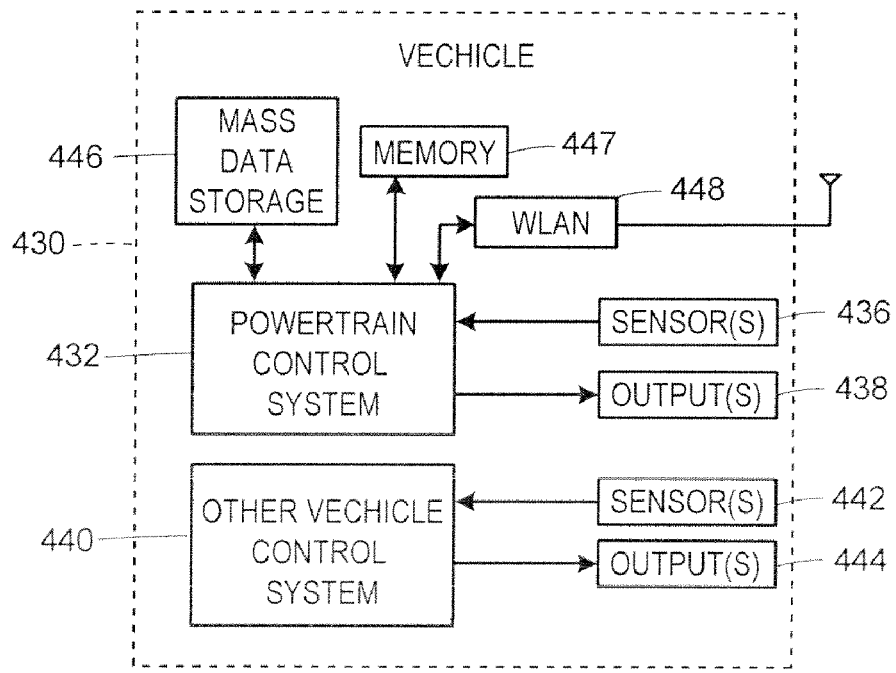

Referring now to FIG. 3D, the present invention may be used in conjunction with a control system of a vehicle 430 having a WLAN interface and/or mass data storage. In some implementations, the present invention may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the beamforming techniques described above. The control system 440 may also include mass data storage, memory and/or a WLAN interface (all not shown).

Figure 3E:
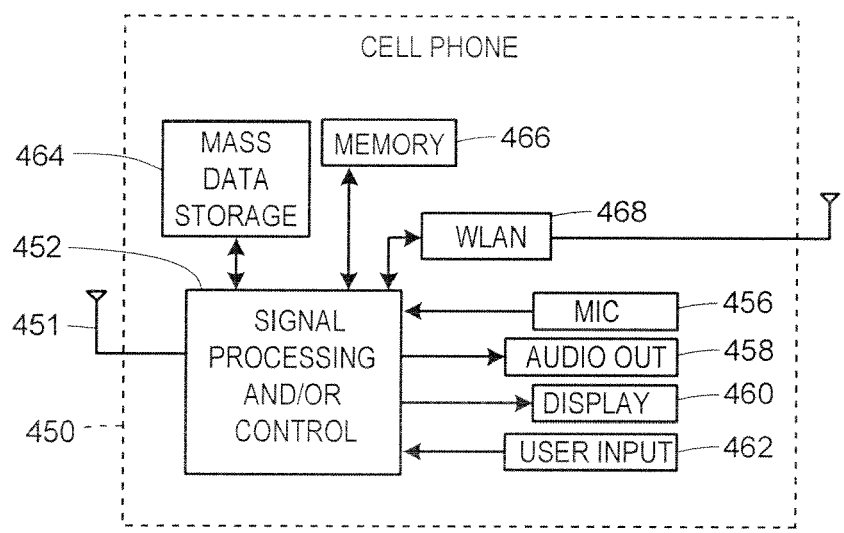

Referring now to FIG. 3E, the present invention may be embodied in a cellular phone 450 that may include one or more cellular antennas 451, either or both signal processing and/or control circuits, which are generally identified in FIG. 3E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 3F:
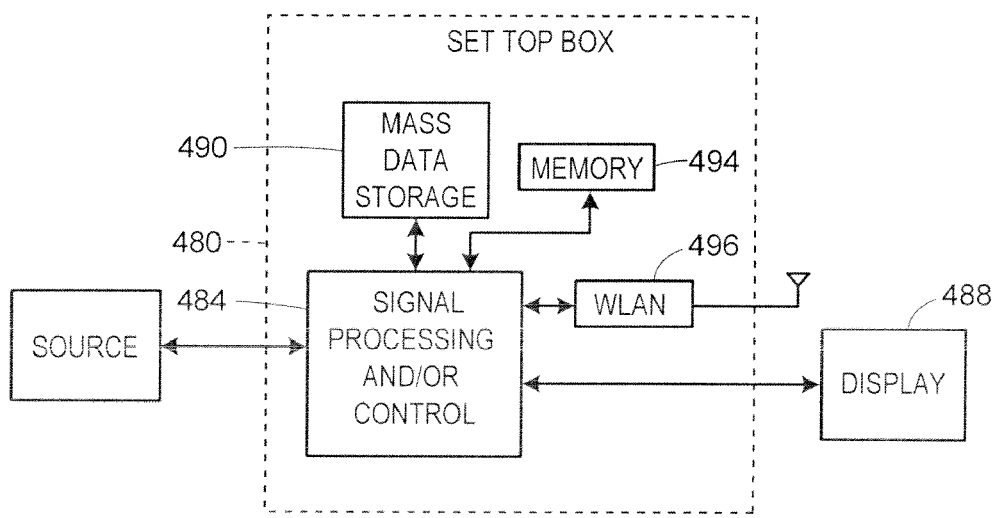

Referring now to FIG. 3F, the present invention may be embodied in a set top box 480 including either or both signal processing and/or control circuits, which are generally identified in FIG. 3F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the beamforming techniques described herein.

Figure 3G:
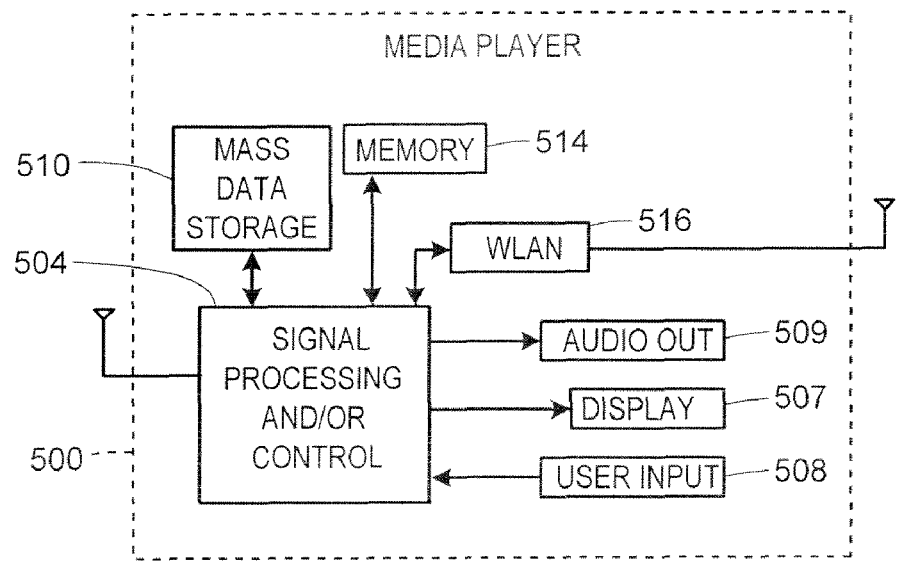

Referring now to FIG. 3G, the present invention may be embodied in a media player 500. The present invention may implement either or both signal processing and/or control circuits, which are generally identified in FIG. 3G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the beamforming techniques described herein. Still other implementations in addition to those described above are contemplated.

Figure 3H:
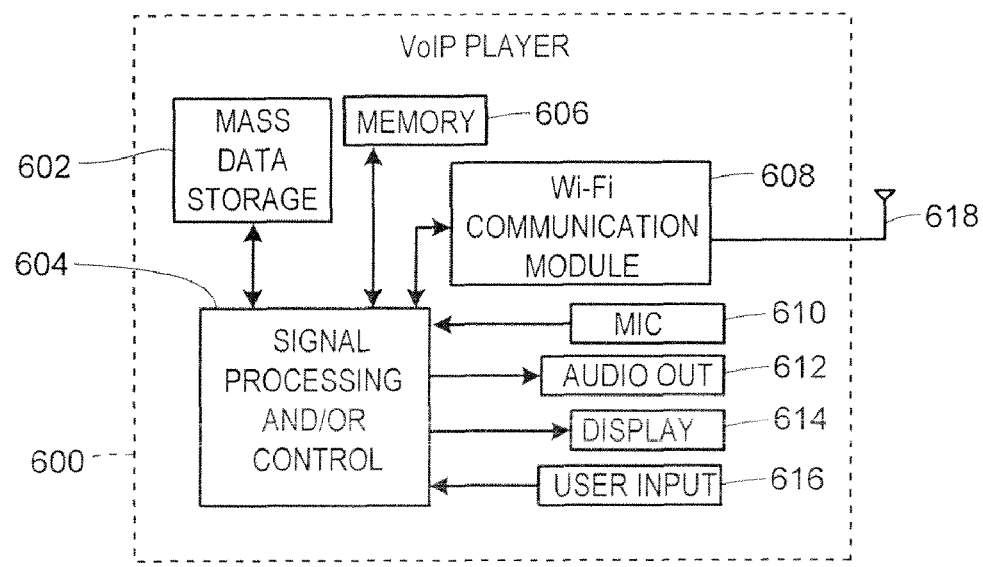

Referring to FIG. 3H, the present invention may be embodied in a Voice over Internet Protocol (VoIP) phone 600 that may include one or more antennas 618, either or both signal processing and/or control circuits, which are generally identified in FIG. 3H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, formal data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the beamforming techniques described herein.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of determining a calibration matrix for implicit beamforming, the method comprising:
    receiving a first estimate of a forward channel, wherein the forward channel is a communication channel from a first station to a second station;
    estimating a reverse channel from signals received from the second station, wherein the reverse channel is a communication channel from the second station to the first station; and
    developing the calibration matrix from i) the first estimate of the forward channel and ii) the estimate of the reverse channel, including
        inferring a second estimate of the forward channel from the estimate of the reverse channel,
        performing a singular value decomposition on the first estimate of the forward channel to generate a matrix $V_F$,
        performing a singular value decomposition on the inferred second estimate of the forward channel to generate a matrix $V_I^H$, and
        developing the calibration factor as a function i) of the matrix $V_F$ and ii) the matrix $V_I^H$.

* * * * *